E. THORESEN 2,769,571

REGISTER COORDINATED CONTROL MECHANISM
FOR CLOSING A METER VALVE

Filed Dec. 13, 1951

INVENTOR
EINAR THORESEN

BY Strauch, Nolan & Diggins
ATTORNEYS

Nov. 6, 1956

E. THORESEN 2,769,571

REGISTER COORDINATED CONTROL MECHANISM
FOR CLOSING A METER VALVE

Filed Dec. 13, 1951

INVENTOR
EINAR THORESEN

BY Strauch, Nolan & Diggins

ATTORNEYS

United States Patent Office 2,769,571
Patented Nov. 6, 1956

2,769,571

REGISTER COORDINATED CONTROL MECHANISM FOR CLOSING A METER VALVE

Einar Thoresen, Pittsburgh, Pa., assignor to Rockwell Manufacturing Company, Pittsburgh, Pa., a corporation of Pennsylvania Application December 13, 1951, Serial No. 261,448

28 Claims. (Cl. 222—20)

This invention relates to predetermining dispensing mechanism for fluid meters and has for its general object and purpose to materially simplify and improve the construction and operation of mechanism of this kind as disclosed in the pending application for patent of Einar Thoresen and George E. Batchelder, Serial No. 88,942, filed April 22, 1949, now United States Patent No. 2,700,487.

Another important object of the invention is to provide novel fluid flow control valve structure which enables the size and weight of the valve unit to be greatly reduced without sacrifice of capacity, while hydraulic shock is reduced to a minimum with easier operation of the valve.

More particularly, in one embodiment, I provide a valve body structure in which the incoming fluid is divided into two streams, together with tandem valve assemblies of the flexible flap type controlling the flow of the fluid streams to a common outlet.

A further object resides in the provision of manually operable means to open the valve and spring means to close the same, together with register controlled latch mechanism for effecting a two phase closing movement of the valve, and means associated with the valve and utilizing the flow line liquid to apply a hydraulic resistance or damping to the action of said spring means and progressively retard the closing of the valve, followed by the sudden release of such hydraulic resistance and a relatively rapid final closing movement of the valve.

An additional object is to provide a very simple and reliably functioning valve latching unit which in turn is operatively controlled by a register tripped latch unit, together with novel means for setting and re-setting the latter latch unit in the opening and closing movements of the valve.

It is also the aim of my present improvements to provide a compact space conserving assembly of the two latch units with each other and the valve, so that these units, together with the meter, may be readily installed in instances where space limitations are a controlling factor.

With the above and other objects in view the invention comprises the improved predetermining dispensing mechanism for fluid meters and the construction and relative arrangement of its several component parts, as will hereinafter be more fully described, illustrated in the accompanying drawings and subsequently incorporated in the subjoined claims.

In the drawings wherein I have disclosed one preferred practical embodiment of my invention and wherein similar reference characters designate corresponding parts throughout the several views:

Figure 1A is an enlarged similar side elevation showing the position of the valve latching elements in an intermediate closing position of the valve;

Figure 3A is an enlarged fragmentary section on 3A—3A of Figure 3;

Figure 5A is a vertical section taken substantially on the line 5A—5A of Figure 5;

General assembly

Figures 1, 15:
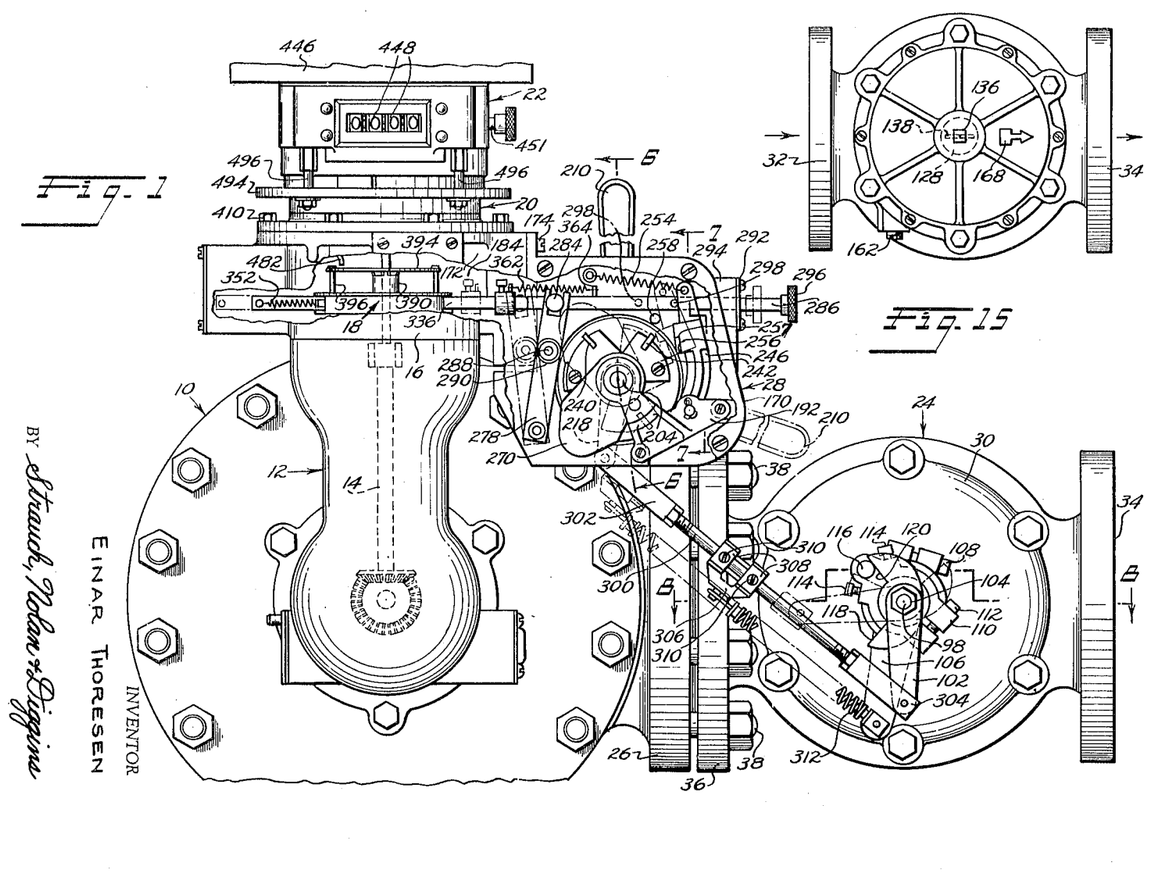
Figure 1 is a side elevation showing a preferred general assembly of the meter, register, valve and control units, certain parts being broken away to illustrate the valve controlling mechanism.
Figure 15 is a rear end elevation of the valve unit.

For purposes of illustration, in Figure 1 of the drawings, I have shown a preferred general assembly of the several component units of my present invention. The fluid pressure operated meter 10 is preferably of the well known "Rotocycle" type, an example of which is disclosed in United States Patent No. 2,274,206, issued February 24, 1942. The meter is provided with a housing 12 for the vertically extending continuously driven meter operated register drive shaft 14 and upon the upper end of this housing a supporting base 16 for a register tripped latch assembly 18 is rigidly secured. Upon the base 16 a swivel adaptor assembly 20 for the register unit 22 is mounted.

The quantity control valve unit 24 is rigidly attached to the fluid outlet connection 26 of the meter and a valve latching unit 28 is mounted on one side of the base 16 and is operatively controlled by the register tripped latch assembly 18, all as will presently be described in further detail.

Figures 8, 12, 13, 14:
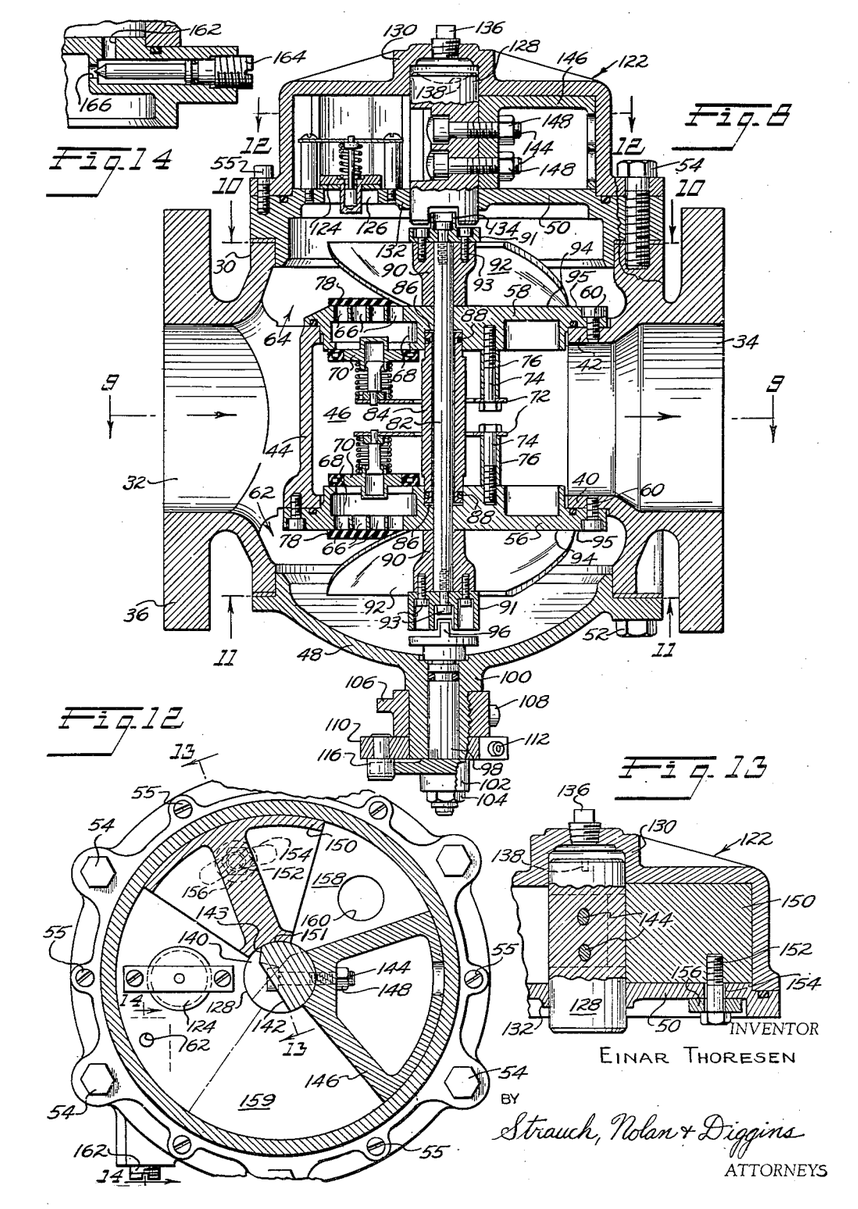
Figure 8 is a horizontal sectional view taken substantially on the line 8—8 of Figure 1.
Figure 12 is a vertical section taken on line 12—12 of Figure 8.
Figure 13 is a detail section on the line 13—13 of Figure 12.
Figure 14 is a similar detail sectional view taken on line 14—14 of Figure 12.

Fluid control valve mechanism (Figure 8)

The valve unit 24 comprises a valve body 30 having diametrically opposite inlet and outlet passages at 32 and 34 respectively. The bolting flange 36 at the inlet side of the valve body is secured to a complementary flange of the outlet connection 26 on the meter body by means of bolts 38.

The valve body 30 is internally divided by an integral web structure comprising front and rear parallel walls 40 and 42 respectively and a parti-cylindrical connecting wall 44 substantially concentric with the outer wall of the valve body. This web structure forms a central chamber 46 in free communication with outlet 34 of the valve body.

Closure heads 48 and 50 for the front and rear sides respectively are secured to the valve body by bolts 52 and 54. Each side wall 40 and 42 of chamber 46 is provided with a similar opening, said openings being closed by the front and rear valve plates 56 and 58 respectively secured to said walls by suitable screws 60. The above described web structure thus forms branch passages 62 and 64 connecting the fluid inlet 32 of the valve body with the spaces between the outer sides of valve plates 56 and 58 and closure heads 48 and 50 respectively.

Each valve plate is provided with spaced ports and in the present instance these ports are in the form of three circumferentially equispaced groups of small diameter openings 66, the openings in each group communicating with a common chamber 68 formed in the valve plate. Communication between the chamber 68 and chamber 46 is normally closed by spring loaded check valves 70 carried by a spider 72 which is rigidly mounted on the valve plate in spaced relation thereto by means of bolts 74 and spacing sleeves 76.

Figures 9, 10, 11:
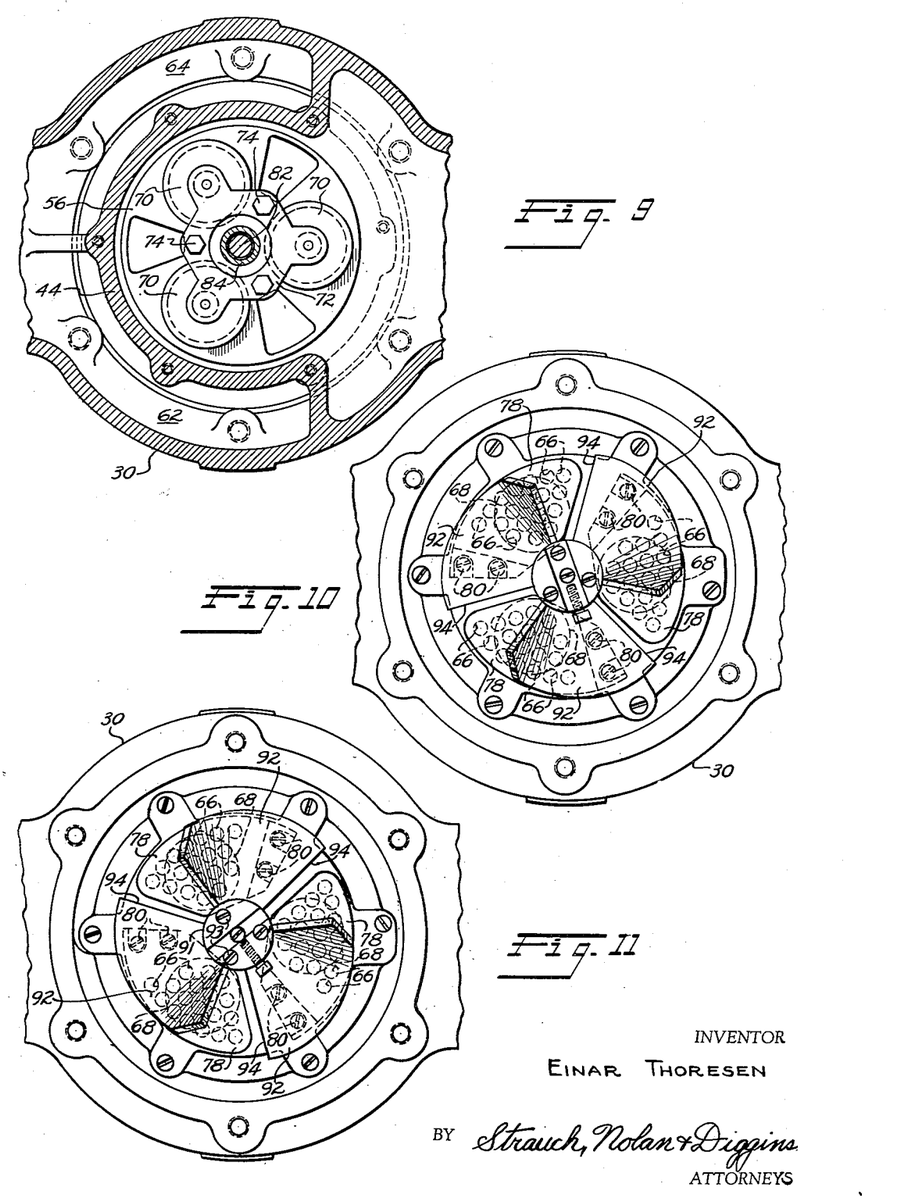
Figure 9 is a vertical section taken substantially on line 9—9 of Figure 8.
Figure 10 is a similar section on line 10—10 of Figure 8.
Figure 11 is a vertical section taken on line 11—11 of Figure 8.

At the upstream side of each valve plate, a flexible resilient sheet rubber valve flap 78 is associated with each group of openings 66 and secured at one of its ends to the face of said plate by spaced screws 80 (Figure 10). A shaft 82 is coaxially journalled in the valve plates 56 and 58 and extends through a fixed sleeve 84 the ends of which are disposed in recesses 86 in the valve plates and provided with fluid sealing rubber O-rings 88. Upon each end of this shaft, the hub 90 of the similar circumferentially spaced lifting blades 92 is non-rotatably secured as by caps 91 and machine screws 93.

The blades 92 are substantially spirally curved about the axis of the shaft 82 and have chamfered leading edges 94 parallel to and in running clearance substantially sliding contact with the flat outer faces 95 of the adjacent valve plates.

One end of the shaft 82 is connected by a tongue and groove driving couple 96 with a stub shaft 98 journalled in an axially projecting boss 100 on the valve body closure head 48. Upon the outer end of shaft 98 a valve operating arm 102 is splined or otherwise non-rotatably mounted and held against axial movement between the end of hub 100 and a nut 104 threaded on the reduced end of shaft 98. A stationary anchoring arm 106 for the valve closing spring has a split collar at one end tightly clamped on the hub 100 by screw 108. Between this collar and valve arm 102, a stop ring 110 is secured on the end of hub 100 by clamping screw 112 and one or more set screws 114 (Figure 1) and carries a stop pin 116. The hub of the valve operating arm 102 is provided with spaced stop shoulders 118 and 120 (Figure 1) in radial relation to the shaft 98 to contact fixed stop pin 116 and positively limit the valve opening and closing movements of the valve flap lifting blades 92.

A dash-pot housing 122 (Figure 8) is secured upon the rear closure head 50 by bolts 54 and 55, the head wall closing the innerside of the dash-pot chamber and having a spring loaded check valve 124, similar to one of the check valves 70, mounted thereon within said chamber. This valve permits the admission of line fluid from the branch passage 64, through opening 126 in the head 50 into the dash-pot chamber.

A relatively large diameter shaft 128 is rotatably supported at one end in a bearing boss 130 on the end wall of dash-pot housing 122 and at its other end in bearing 132 on the closure head 50. Shaft 128 is connected, in coaxial relation, to valve operating shaft 82 by a tongue and groove driving coupling 134. The end wall of boss 130 has a central threaded opening normally closed by a plug 136 and the corresponding end face of shaft 128 is provided with a diametrically disposed slot 138 for a purpose to be later explained.

Intermediate its ends, shaft 128, at one side thereof as shown in Figure 12, is cut away to provide a by-pass sector or recess 140, the base wall 142 of which is disposed at a predetermined angle to the slot 138 in the end face of the shaft and at one end is obliquely inclined as at 143. From the wall 142 axially spaced openings extend diametrically through the shaft in parallel relation with the slot 138. These openings receive bolts 144 which extend through registering openings in the inner end wall of a hollow piston segment 146. The external surface of this piston wall is curved on the radius of shaft 128 and is tightly clamped against the periphery of the shaft by nuts 148 threaded on the outer ends of the bolts 144. The outer end wall of piston segment 146 has running clearance contact with the inner surface of the cylindrical body wall of housing 122, while opposite ends thereof are in running clearance contact with the end wall of said housing and closure head 50 respectively.

A stationary segment 150, of substantially the same dimensions as piston segment 146, is secured in the dash-pot chamber adjacent to the check valve 124, as by a cap screw 152 projecting through a curved slot 154 in the wall of closure head 50 concentric to the axis of shaft 128 and threaded in said segment. The curved inner end 151 of segment 150 has sliding clearance with shaft 128. Washer 156 is disposed between the head of screw 152 and the inner face of closure head 50. By loosening screw 152, the segment 150 may be quickly adjusted circumferentially of the shaft 128 and fixed in position relative to the movable piston segment 146 to determine the time of opening communication, in the closing movement of lifting blades 92, between by-pass 140 and the space 158 between segments 146 and 150 which is always in communication with the inlet side of the valve through opening 160 in the wall of closure head 50 and branch passage 64.

Thus line fluid pressure is always present in the space 158 between the movable and fixed segments 146 and 150. The parts are shown in valve open position in Figure 12. Upon movement of lifting blades 92 toward closed position segment 146 rotates clockwise in Figure 12 but since check valve 124 is closed in that direction this movement is controlled by escape of the fluid from space 159 through metering port 162 back into the line. As shown in Figure 14 the size of the bleed through port 162 may be varied by adjustable needle valve 164 and opening 166 to vary the damping action of the dash pot on the closing valve. After predetermined damped rotation of segment 146 the by-pass 140 will connect spaces 158 and 159 for a purpose to appear.

In the assembly of the rear closure head and dash pot assembly on the valve body, plug 136 is removed and a drive bit or other implement engaged in the slot 138 in the end of shaft 128. The shaft is then rotated until slot 138 is aligned with an arrow 168 on the end wall of housing 122, as seen in Figure 15. With valve lifting blades 92 in full open position, the head 50 is then assembled on the valve body with arrow 168 aligned with the axial center of valve outlet 34, in which position of head 50 the inner end of shaft 128 will be connected with shaft 82 by the drive coupling 134. After bolts 54 and 55 have been tightened, the front closure head 48 is then applied and shaft 98 connected with the other end of shaft 82 by driving coupling 96.

*Valve latch assembly*

The mechanism for latching the valve is best shown in Figures 1, 1A, 6 and 7 and is mounted in a housing 170 secured to a rectangular boss 172 formed on one side of the base 16 by screw 174 and nut 176 threaded on stud 178 fixed in boss 172 and extending through apertured lug 180 formed on the wall of housing 170. Base 16 is rigidly secured upon the upper end of meter housing member 12 by suitable screws indicated at 182 (Figure 2) and the open end of housing 170 attached to boss 172 communicates with the interior of the cylindrical body portion of the base through opening 184 in said boss.

The front open side of housing 170 is closed by a cover member 186 secured to the housing wall by screws 188. This cover member has a lower forwardly projected portion 190 to accommodate a shaft supporting bracket 192 and certain gear elements to be presently described. This bracket is rigidly secured at spaced points to internal bosses 194 formed on the housing wall, by the screws 196. At its upper end the bracket 192 is formed with a shaft receiving bearing 198 projecting outwardly through an opening 200 in the front wall of portion 190 of the housing cover 186. In suitably spaced relation from the bearing 198 one end of an inwardly projecting stub shaft 202 is fixed in the bracket 192.

The latch operating shaft 204 has its forward end journalled in bracket bearing 198 and is suitably splined for non-rotatable connection with one end of a handle 206 which is secured against axial movement on the shaft by set screw 208. Preferably a similar handle 210 is secured by set screw 212 on the opposite splined end of the shaft which extends rearwardly from housing 170 and is journalled in a bushing 214 mounted in bearing boss 216 on the housing wall. A downwardly extending arm 218 is non-rotatably engaged upon the splined portion of the shaft and is held against axial movement between the boss 216 and a spacing sleeve 220 interposed between said arm and the end of handle 210.

Figure 6:
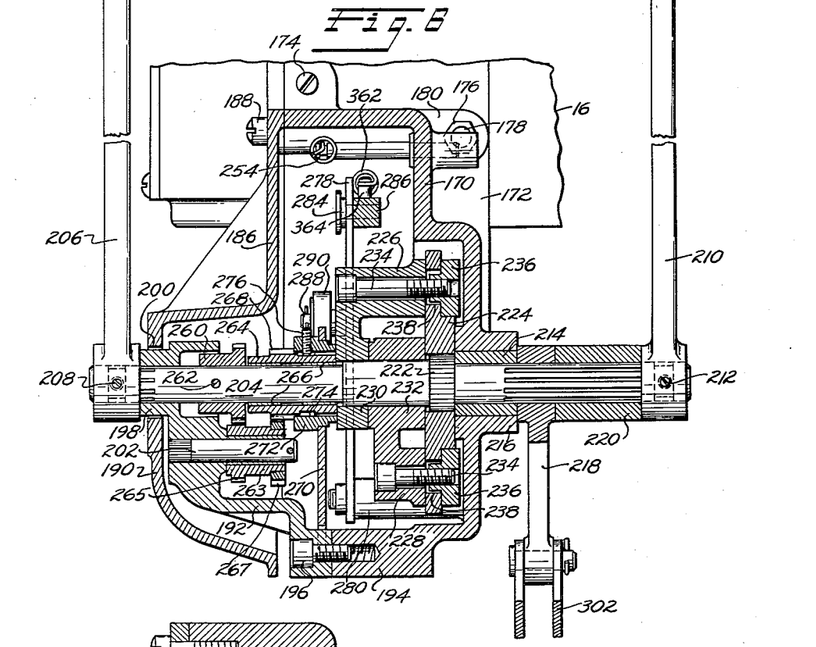
Figure 6 is a sectional view taken substantially on line 6—6 of Figure 1.
Figure 7:
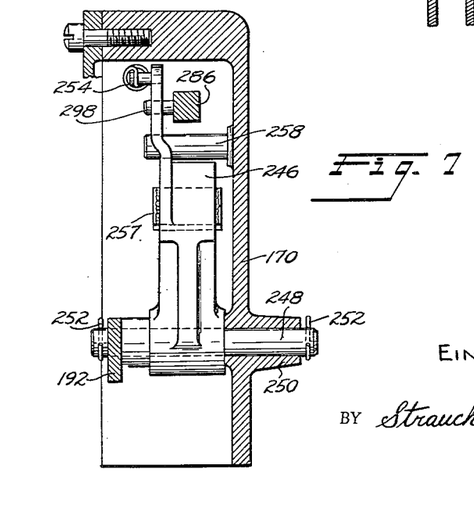
Figure 7 is a similar sectional view taken on line 7—7 of Figure 1.

The inner end of bushing 214 abuts one side of an enlarged splined portion 222 formed on the shaft 204 upon which a disk 224 is non-rotatably engaged. Adjacent to this disk the hub portions 230 and 232 of two detent carrying members 226 and 228 respectively are freely mounted on shaft 204. As seen in Figure 6, these detent carrying members have outer axially extending portions contacting the adjacent side face of disk 224 against which they are adapted to be adjustably clamped by the nuts 236 threaded on the ends of bolts 234 mounted in the members 226 and 228 and extending through arcuate slots 238 in the disk 224 disposed in concentric relation to the axis of shaft 204. By properly adjusting said members relative to the disk, latching detents 240 and 242 carried by the respective members 226 and 228 may be disposed in the required circumferentially spaced relation to each other to serve as spaced stops for a purpose to appear. Detents 240 and 242 are preferably hardened steel wear resistant inserts projecting radially from members 226 and 228 which may be of softer metal.

At one side of disk 224 the lower curved end of a latching lever 246 (see Figure 7) is rockably mounted between bosses on the rear wall of housing 170 and bracket 192 upon an arbor 248 mounted at its ends in said bracket and a rearwardly projecting bearing boss 250 on the housing wall. Arbor 248 is restrained against axial movement by cotter pins 252 at each end thereof. One end of a tension spring 254 is anchored to the housing wall and connected at its other end to the upper end of lever 246 to bias said lever inwardly to a normal position where the latch face 256 on a wear resistant steel insert 257 on lever 246 is disposed for engagement with the detents 240 and 242. Movement of the lever to this position is arrested by stop pin 258 on the housing wall.

In axially spaced relation from the detent carrying members and adjacent to bracket 192, a gear 260 is fixed to shaft 204 by pin 262, and between gear 260 and the hub 230 of member 226 a sleeve 264 is rotatably mounted on said shaft, bearing bushings 266 preferably being interposed between the sleeve and shaft. The sleeve 264 is externally provided with spur gear teeth 268 intermediate its ends and, between these teeth and hub 230 of member 226, the hub 272 of a cam 270 is secured on said sleeve by the key 274 and set screw 276. A sleeve 263 journalled on fixed shaft 202 carries spaced gears 265 and 267 of different diameters in constant mesh with gears 260 and 268 respectively.

Adjacent the cam 270, a lever 278 is pivotally mounted at its lower end upon a stud 280 fixed to the wall of housing 170 and at its upper end is provided with a slot 282 (Figure 2) in which a headed stud 284 on the front section 286 of a rectangular latch tripping bar is engaged. Intermediate the ends of lever 278 a stud 288 is fixed upon which a follower roller 290 is mounted for engagement by the cam 270. Bar section 286 is slidably guided in cover plate 292 secured over the outer end of an opening in boss 294 on the wall of housing 170 and is provided on its forward end with a hand knob 296. In the outward movement of bar section 286, a pin 298 thereon engages the upper end of latch lever 246 and moves the latter to release position, as shown in full lines in Figure 1 of the drawings.

A rod 300 is provided with a clevis 302 at one end pivotally connected with the outer end of arm 218 on shaft 204, and with a similar clevis 304 at its other end pivotally connected with valve operating arm 102 on shaft 98. A bracket member 306 is provided with spaced collars 308 rigidly fixed on rod 300 by set screws 310 and to this bracket one end of a valve closing tension spring 312 is connected, the other end of said spring being anchored to the fixed arm 106.

*Register tripped latch assembly*

The effective operation of the tripping bar for valve latching lever 246 is in turn controlled by the latch assembly 18 which will now be described with particular reference to Figures 1 to 4 of the drawings.

The latch casing 314 (see Figure 2) has a bottom wall provided with an external annular shoulder seated in a recess 316 in the base 16 and is rigidly secured to said base within the cylindrical body thereof by suitable screws indicated at 318. This bottom wall of the latch casing is provided with an axially located rectangular opening 320. Adjacent to this opening within the casing a latching lever 322 is pivotally mounted at one end on a stud 324 fixed in the bottom wall of the casing. This lever lies and pivots in a plane parallel with and closely adjacent to said casing wall and terminates at its pivoted end in a short angularly disposed arm 326 projecting outwardly from pivot stud 324 toward the cylindrical body wall of the casing. Lever 322 is curved and extends from stud 324 around one side of opening 320, the other end of the lever being slidably guided by a lug 328 projecting radially inward over said lever from the cylindrical casing wall and substantially in diametrical alignment with the pivot stud 324. At one side of guide lug 328 the bottom wall of the casing is provided with an opening 330 over which the end of lever 322 extends when said lever is in the position shown in full lines in Figure 3 of the drawings. The lever 322 carries a latching roller 332 mounted on stud 334 fixed in the lever adjacent pivot stud 324 and at the opposite side thereof with respect to the lever arm 326.

Figures 1, 3:
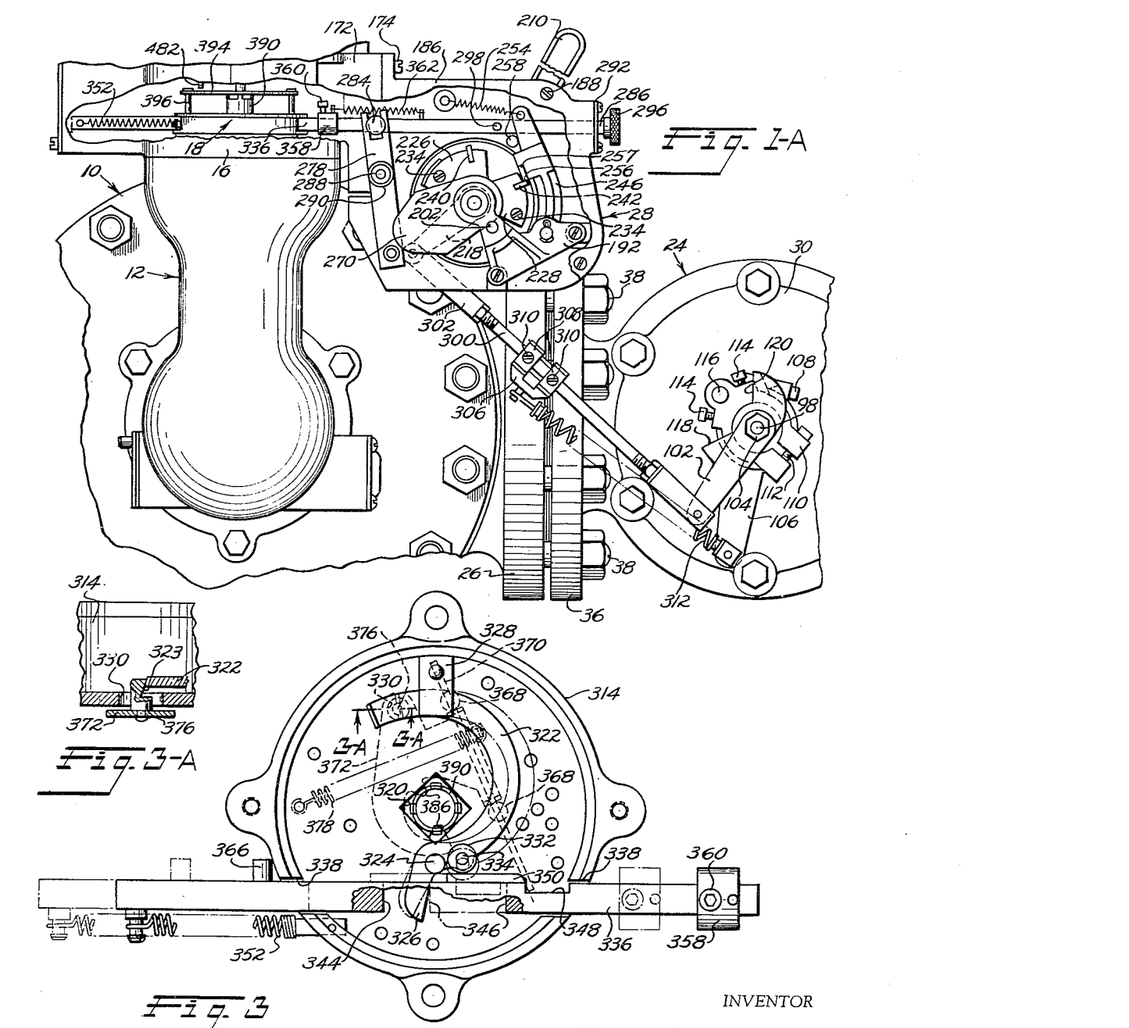
Figure 3 is a top plan view of the meter tripped latch assembly partly in section, the cover plate being removed, and showing the latch parts in latching position in dotted lines illustrating the engagement of the latch lever and pin.

The rear section 336 of the trip bar for valve latching lever 246 is slidably guided in alignment with the forward section 286 of said bar in the notches or recesses 338 formed in the cylindrical body wall of casing 314 and opening upon the upper edge thereof. Bar section 336 is retained in said notches by the cover plate 340 for the open top of the casing body which is secured thereon by screws 342 inserted upwardly through openings in the bottom wall of the casing and threaded in said cover plate. Bar section 336, within the casing 314, has a longitudinal slot or recess 344 in its lower face which receives the latch lever arm 326 and provides an abutment or shoulder 346 at the forward end of said recess to coact with said arm 324. In suitably spaced relation from the shoulder 346 a notch or recess 348 is formed in the inner face of bar 336 and a longitudinal rib 350 is formed on said face of the bar upon which the roller 332 on lever 322 rides in the movement of bar 336 to and from its latched position.

Externally of the latch case 314 one end of a spring 352 is suitably anchored to said case and connected at its other end to the rear end of trip bar section 336. The forward end of said bar section is provided with an axially extending bore 354 which slidably receives a reduced cylindrical extension 356 on the rear end of the forward bar section 286. A collar 358 is secured on the forward end of bar section 336 by set screw 360 and to this collar one end of spring 362 is connected, the other end thereof being attached to a pin 364 on the forward bar section 286. Spring 362 normally holds the two sections of the tripping bar against relative movement and maintains close abutting contact between their opposed rectangular end faces. Movement of the tripping bar under the action of spring 352 is limited by stud 366 on bar section 336 striking the body wall of the latch case 314, as shown in Figure 3.

Spaced depending external studs 368 are fixed in the bottom wall of the casing 314 in which the ends of a pivot rod 370 are non-rotatably mounted. A plate 372 has spaced apertured ears 374 rockably mounted on rod 370 between the studs 368 and in spaced relation from said rod carriers an upstanding pin 376 that projects through opening 330 in the bottom wall of the casing 314 to coact with lever 322 as will appear. At the opposite side of rod 370 with respect to pin 376, one end of a spring 378 is attached to a lug 380 on plate 372, the other end of said spring being anchored to the casing wall, as at 382.

A curved arm 384 on plate 372 extends around one side of the rectangular opening 320 in the bottom wall of casing 314 and spaced lugs 386 on the inner edge of this arm project inwardly over said opening. A tube 390 passes loosely through a central opening in the cover 340 of casing 314 and through opening 320 in the bottom wall thereof where said tube is supported on the lugs 386 of plate 372. A disk 394 is vertically movable upon spaced parallel guide pins 396 fixed to the cover 340 of casing 314 and is provided with a central opening of smaller diameter than the tube 390, so that the disk is at all times in contact with said tube. A motion transmitting shaft 398 extends upwardly entirely freely through the tube 390 and is connected at its lower end by driving coupling 400 with the upper end of meter driven shaft 14.

The spring 378 normally holds the plate 372 substantially flat against the bottom wall of casing 314 with the pin 376 projecting above the upper surface of said wall within the casing. It will therefore be evident that when the parts of the latch are in the full line position of Figure 3, with the end of lever 322 extending over and in contact with the upper end of pin 376, the spring 378 is under stress and constantly urges the pin upwardly against the lower surface of lever 322. When bar 336 is moved to the left in Figure 3 the lever 322 is rocked in clockwise direction, as above explained and moved out of contact with pin 376, at approximately the same time that roller 332 on the lever moves over the end of rib 350 on bar 336 and into recess 348. Spring 378 then contracts to rock plate 372 on rod 370 and position the upper end of pin 376 behind the end of lever 322, thus latching said lever and bar 336 in set position against the action of spring 352, as seen in dotted lines in Figure 3 of the drawings. When any part of disk 394 is depressed, tube 390 is forced downwardly to rock plate 372 against the resistance of spring 378 and move pin 376 downwardly in opening 330. Lever 322 is thus released whereupon spring 352 instantaneously acts to return bar 336 and the latch parts to the full line positions of Figure 3. Preferably, see Figure 3A, the end of lever 322 is beveled at 323 to interfit with a locking recess on the side of pin 376 to prevent accidental release.

This register controlled latch unit 18 is not specifically claimed herein but is fully described and claimed in an application for patent of George E. Batchelder, Serial No. 283,740 filed on April 22, 1952, now United States Patent No. 2,700,308.

*Register drive and latch trip mechanism*

Figure 2:
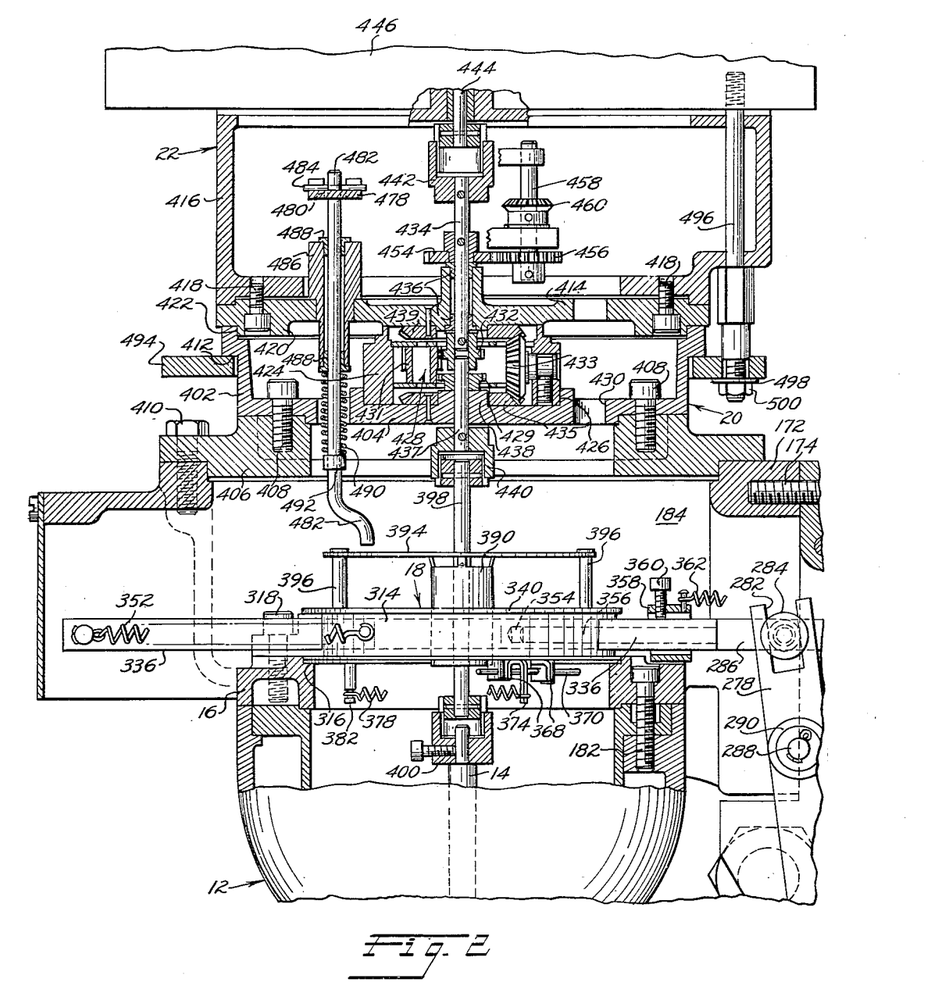
Figure 2 is an enlarged vertical sectional view through the register adaptor assembly and latch box base, showing the driving connections between the meter and register.

The adaptor unit 20 comprises a member 402 having a cylindrical body wall and a base wall 404 rigidly secured to the cover member 406 for the upper end of the cylindrical body of base 16 by suitable screws 408, said cover being secured on base 16 by cap screws 410. The body wall of member 402 near its upper end is provided with an external annular shoulder 412, the purpose of which will be presently explained. A plate 414 is secured to the bottom wall of the register casing 416 by screws, as indicated at 418, and is formed with a flange 420 rotatably seated in internal annular recess 422 at the upper end of the cylindrical wall of member 402. A cylindrical housing member 424 which functions as a drive gear carrier extends between plate 414 and the base wall 404 of member 402 and is rotatably seated in a recess 426 formed in the upper surface of wall 404. Within this housing a register drive gear assembly 428 is contained. A 180° slot 430 concentric to housing 424 is provided in wall 404. The mounting of the register unit 22 and gear assembly 428 is substantially the same as corresponding parts of the disclosure contained in the above mentioned joint application.

Drive gearing 428 comprises a gear 429 secured upon shaft 437 meshed with an intermediate idler gear (not shown) which in turn is meshed with idler gear 431 that is shown in Figure 2 meshed with gear element 432 fixed to the lower end of a vertical shaft 434 journalled in spaced bearings 436 on plate 414. This gear element 432 has an axial bore which pilots the upper end of shaft 437 journalled in bearing boss 438 on wall 404 of member 402. The lower end of shaft 437 is connected with the upper end of shaft 398 by driving coupling 440.

Referring to Figure 2, a bevel gear 433 is journalled on a horizontal axis in carrier 424 and constantly meshed with identical bevel gears 435 and 439, fixed to walls 404 and 414 respectively, for a purpose to appear. The upper end of shaft 434 may be connected by driving coupling 442 with an operating shaft 444 for a straight reading totalizing register 446, mounted on the register unit 22, to register the aggregate of a plurality of predetermined quantities of fluid dispensed through the meter 10.

The register unit 22 is of more or less standard type having a series of digit wheels 448 mounted in a suitable frame 450 within the casing 416 and provided with a manually operable shaft 451 for setting said wheels. A gear train 452 mounted in frame 450 transmits the drive to the digit wheels from shaft 434 through gear 454 fixed on said shaft and meshing with gear 456 fixed on the lower end of vertical shaft 458 journalled in the frame 450. A beveled gear 460 fixed to the latter shaft is in constant mesh with a similar gear 462 (Figure 5) coaxially fixed to a terminal element of gear train 452.

Figures 4, 5:
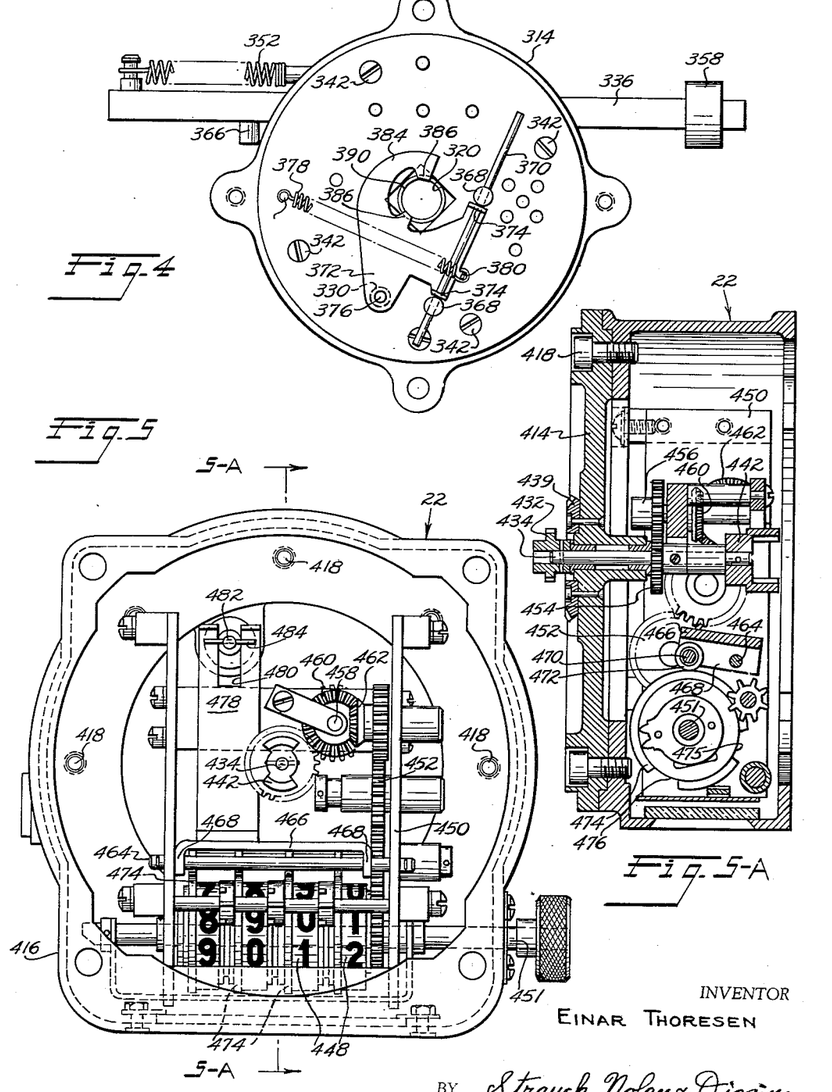
Figure 4 is a bottom plan view of the latch assembly.
Figure 5 is a top plan view of the register, showing the actuating means for the latch trip rod.

On a rod 464 supported in frame 450 in parallel relation to the axis of digit wheels 448, flanges 468 on opposite ends of a plate 466 are rockably mounted near one longitudinal edge of said plate. Near the opposite edge of said plate, flanges 468 are connected by a rod 470 on which a series of rollers 472 are mounted in axially spaced relation. These rollers respectively contact the peripheries of spaced relatively large diameter disks 474 on one side of the digit wheels 448. These disks are provided with peripheral notches 476 and are properly selected so that the notches will be in alignment to receive the rollers 472 when certain quantities of the predetermined gallonage have been registered.

At the opposite side of shaft 434 with respect to shaft 458, an arm 478 is fixed to the plate 466 and extends rearwardly therefrom. The rear end of this arm is provided with a slot 480 through which the upper end of trip rod 482 extends. This rod carries pin 484 extending across the slot 480 in contact with the upper surface of arm 478. Trip rod 482 extends downwardly through spaced guide bushings 488 in member 486 mounted in the plate 414. A spring 490 is interposed between the lower guide bushing 488 and a collar 492 fixed on the trip rod and urges said rod downwardly to position the lower end thereof as limited by arm 478, about one-sixteenth of an inch above the plate 394. The spring also acts to maintain pressure contact between the rollers 472 and disks 474.

It will be apparent from the above description that in the operation of register 22, after a part of the predetermined quantity of fluid has been delivered through the meter, rollers 472 will be received in the aligned notches 476 in disks 474 under the action of spring 490 which will then force trip rod 482 downwardly depressing plate 394 and tube 390 to release the latch bar 336 in the manner heretofore described.

In many truck tank filling installations, provision must be made for filling the tank from either of two opposite sides of a platform upon which the meter is located. Thus it becomes necessary to change the position of the register unit relative to the meter so that the digit wheels of the register can be easily read in filling the truck tank from either side of the platform. The gearing assembly 428 and rotatable housing 424 permits such rotation of the register unit 22 without change in the reading of the register digit wheels, the trip rod 482 moving with the register in slot 430 in the fixed member 402. Disc 394 is in the path of rod 482 in all positions of the register. A suitable stop is usually provided between the parts to limit this rotation to 180° in either direction.

A clamping ring 494 is provided surrounding the cylindrical body wall of member 402 beneath the shoulder 412 thereon. A plurality of bolts 496 have their upper ends threaded in the base of register 446 or in the base of register 22 when a totalizing register is not used. The lower threaded ends of these bolts pass through openings in the ring 494 to receive friction washers 498 and nuts 500. These nuts are tightened sufficiently to frictionally resist rotation of register 22 about the axis of shaft 434, but to permit the above described 180° rotation when desired. During this 180° rotation of the register, the bevel gearing 439, 433, 435 will cause a 90° rotation of carrier 424 in the same direction as register is turned and the elements of gearing 428 will so compensatively rotate idler gear 431 during such rotation of the register that no rotation will be imparted to shaft 434 with respect to registers 22 and 446 by reason of such rotation of the register and there will be no error introduced into the register reading.

Operating cycle

Assuming that it is desired to dispense one thousand gallons of fluid delivered by meter 10 in each operation of control valve unit 24, this number is first set up upon the digit wheels 448 of the register 22. The handle 206 or 210 is then moved in clockwise direction to the position shown in dotted lines in Figure 1, thus rotating shaft 204, and, through the speed multiplying gearing 260, 265, 267, 268 shown in Figure 6, rapidly moving cam 270 upwardly from the full line position of Figure 1 to the dotted line position. This cam by contact with roller 290 moves lever 278 to the position shown in dotted lines, thereby moving trip bar sections 286 and 336 to the left against resistance of spring 352. Register tripped latch unit 18 releasably retains the trip bar in the dotted line position of Figure 1 as above explained, and latch lever 246 is moved inwardly by spring 254 to dispose its latching surface 256 in the path of detents 240 and 242.

During this rapid movement of the cam 270 and after lever 278 has been actuated, rotation is transmitted by connecting rod 300 to valve operating shafts 98 and 82 at relatively slow speed. As seen in Figure 11, valve lifting blades 92 are thus oscillated in clockwise direction and their leading edges 94 slide under the free ends of flaps 78 to lift the flaps and progressively uncover the groups of fluid inlet openings 66. When the valve flaps are in full open position shoulder 118 on arm 102 (Figure 1) contacts stop 116 and detent 240 is engaged by latch lever 246 and the lifting blades 92 latched against reverse movement to closed position under the action of spring 312. The two streams of fluid now flow through openings 66 in valve plates 56 and 58 into the chambers 68. Check valves 70 are held open by the fluid pressure so that the two streams of fluid join in chamber 46, and then pass through outlet 34.

Shaft 128 is of course also rotated in this valve opening movement of the blades 92 and dash pot piston segment 146 is moved from the dotted to the full line position shown in Figure 12. This movement of the piston creates a reduced pressure in chamber 159 so that check valve 124 is opened and fluid enters chamber 159 from passage 64.

When a part of the predetermined quantity of fluid has been delivered through the valve, say 970 gallons, the register controlled latch device 18 is tripped, as above described, to release the bar 336 whereupon said bar with bar section 286 moves to the full line position of Figure 1 under the action of spring 352, disengaging lever 246 from detent 240 and returning lever 278 to normal position. Valve closing spring 312 then acts to rotate shafts 204 and 82 in counter-clockwise direction and, before any appreciable closing of the valve ports 66 occurs, cam 270 is rapidly moved downwardly from the dotted line position of Figure 1, by the gearing in Figure 6, to actuate lever 278 and reset the trip bar 286—336 in its latched position as seen in dotted lines in Figure 3 of the drawings. As the blades 92 are moved in valve closing direction by spring 312 the dash pot piston segment 146 moves clockwise from the full line position of Figure 12 with respect to the fixed segment 150 towards the dotted line position seen in Figure 12. The line fluid is expelled from chamber 159 through metered outlet 162 and this dampens or restrain the movement of blades 92 so that ports 66 will be progressively closed by the valve flaps 78 with a gradually diminishing flow of fluid through the outlet 34. Shortly before the final 30 gallons have been dispensed detent 242 engages latch lever 246 to stop the closing movement of blades 92 as seen in Figure 1A. When digit wheels 448 of the register all read zero, notch 475 aligns with notches 476 and the latch device 18 is again tripped by register controlled rod 482 so that pin 298 on bar 286 will in turn trip valve latching lever 246 to release position. At substantially the same time dash pot piston segment 146 and the base wall 142 of by-pass 140 in shaft 128 reach approximately the positions shown in dotted lines in Figure 12 and the fluid pressure in chambers 158 and 159 is equalized, thus eliminating the restraint of the dash pot since fluid may now go back into the line through opening 160. Spring 312 rapidly completes the final closing movement of blades 92 and valve flaps 78 are urged by fluid pressure in passages 62 and 64 into tight sealing contact with plates 56 and 58 over the openings 66 therein. In this manner the flow of fluid through valve unit 24 in predetermined quantity is very accurately controlled and the fluid flow is abruptly cut off without hydraulic shock.

In event of emergency, lever 246 of the valve latching unit 28 may be moved to release position independently of the register tripped latch unit 18, and the valve closed by spring 312, by grasping the knob 296 and pulling bar section 286 forwardly relative to rear bar section 336 against the resistance of spring 362. Pin 298 will thus move the levers 246 and 278 to the full line positions of Figure 1 while the rear bar section 336 remains latched by unit 18 in the dotted line position. The cylindrical rear end of bar section 286 has sufficient length to prevent complete disconnection of said section from the rear bar section 336. When shoulder 120 on arm 102 strikes the stop 116, indicating that the valve is fully closed, knob 296 is released and bar section 286, levers 246 and 278 are returned to normal position with respect to rear bar section 336 by the springs 362 and 254 respectively.

From the foregoing description and the accompanying drawings it is believed that the construction and manner of operation of the present invention may be fully understood. It will be seen that I have notably simplified the valve latching mechanism of the above mentioned joint application and thereby insured more efficient and reliable operation of the quantity control valve with the more accurate delivery of the fluid in the desired predetermined quantity. This simplification has been obtained by replacing the mechanical means of said application for damping the closing movement of the valve with the dash pot structure of Figures 12 to 15 and utilizing the flow line fluid in its passage through the valve body to impress a damping influence on the movement of the flap lifting blades 92 in valve closing direction.

Secondly, by providing the valve body with internal web structure to divide the incoming fluid into two streams with tandem valve assemblies at opposite sides of said web structure, turbulence and hydraulic shock is reduced to a minimum. The size and weight of the valve unit for a required flow capacity has also been materially reduced. Also, the valve will more easily open with a minimum application of manual force against prevailing normal pressures at gasoline and fuel oil loading racks. The dash pot controlled throttling closing movement of the valve is independent of the meter, relieving the latter of additional load. A novel feature of this dash pot control is that is uses line fluid which is new in my invention.

Finally, it will be noted, from reference to Figure 1 of the drawings, that, by reason of the reduced size of the valve unit 24 and latching unit 28, these units may be arranged in closely grouped relation with the meter so that installations may be made where the available space is comparatively limited.

My general valve structure is readily dismantled for servicing by removing the dash pot assembly and the other end plate so that access to the interior for inspection and replacement of the flaps is convenient and easily accomplished.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In predetermining mechanism for fluid meters, a fluid flow control valve, actuating means operatively connected with said valve manually operable to open the valve, a valve closing spring connected with said valve energized by opening of said valve, said actuating means including a shaft, means for successively latching said valve in full and partly open positions comprising a pair of circumferentially spaced stops and means mounting said stops for angular movement with said shaft, a pivoted latch lever spring biased toward latching engagement with said stops, and means operable at predetermined times and responsive to increments of fluid flow through the meter to trip said latch lever out of engagement with the respective stops and permit staged closure of said valve by said spring.

2. In predetermining mechanism for fluid meters as defined in claim 1, said mounting means for the latch stops comprising a disk fixed on said shaft, stop carrier members mounted on said shaft for relative circumferential adjustment to variably space the stops from each other, and means for rigidly securing said carrier members to said disk in their adjusted positions.

3. In predetermining mechanism for fluid meters as defined in claim 1, said latch lever tripping means comprising a trip member and a spring urging said member in one direction to disengage the latch lever from said stops, a separate meter register controlled latch to releasably latch said trip member against movement in said one direction, and means for setting and resetting said trip member in latched position in the opening and closing operation of said valve actuating means, including a cam element and connecting means between said element and said shaft operable to move the cam element about the axis of said shaft relative to said stops.

4. In predetermining mechanism for fluid meters as defined in claim 3, said connecting means comprising speed multiplying gearing having terminal gear elements fixed to said shaft and cam element respectively.

5. In predetermining mechanism for fluid meters, a fluid control valve, means for latching said valve in full and partly open positions, including a spring biased latch lever and a pair of spaced detents adapted to coact therewith, means operable at predetermined times to trip said latch lever out of engagement with the respective detents comprising a movable trip member and a spring urging said member in one direction to move the latch lever to disengaged position, a separate meter register controlled latch to releasably latch said trip member against movement in said one direction, means for setting and resetting said trip member in latched position in the opening and closing movements of the valve including a pivoted lever operatively connected with said trip member and a relatively movable operating member for said lever, a rotatably mounted actuating shaft common to said valve, latch detents and trip operating member, and individual connecting means between said shaft and the valve, latch detents and trip operating member to actuate the latter in timed relation to each other.

6. In predetermined mechanism for fluid meters as defined in claim 5, said detents and operating member being mounted and arranged in coaxial relation with said shaft.

7. In predetermining mechanism for fluid meters as defined in claim 6, wherein the connecting means between said shaft and operating member comprises speed multiplying gearing effective to rapidly set the trip member in latched position in the initial movement of the valve to and from full open position.

8. In predetermining mechanism for fluid meters as defined in claim 5, wherein said trip member comprises a spring held part manually operable independently of said register controlled latch to move said valve latching lever to disengaged position.

9. In predetermining mechanism for fluid meters having a fluid flow control valve provided with an operating shaft, with manually operable means for actuating said shaft in valve opening direction and means biasing the valve to normal closed position; meter register controlled latch mechanism operative to effect a two-step closing movement of the valve under the action of said biasing means, means for applying a throttling influence to the valve during the first step of its closing movement and to be inactive during the second step including a hydraulically damped piston member connected with the valve shaft and additional means operatively controlled by said valve shaft, terminating the damping action of said piston substantially at the start of the second step closing movement of the valve, to provide a relatively rapid movement of the valve to fully closed position.

10. In predetermining mechanism for fluid meters as defined in claim 9, said additional means comprising a bypass through the valve shaft for connecting chambers at opposite sides of the piston.

11. A control valve for fluid flow lines and an oscillatory operating shaft therefor adapted to be connected with power means for oscillating said shaft in valve closing direction, means for throttling closing movement of the valve comprising dash pot structure including a hydraulically damped member connected to and movable in unison with said shaft and also including means to inactivate damping action of said member during valve opening movement, activate damping action of said member to retard valve closing movement during the initial portion of valve closing and to inactivate damping action of said member during final closing movement of said valve.

12. A control valve for fluid flow lines and an oscillatory operating shaft therefor adapted to be connected to power means for oscillating said shaft in valve closing direction, means for throttling closing movement of the valve comprising a dash pot housing in coaxial relation with said shaft, a radially disposed fixed segment in said housing, a radially disposed piston segment connected to and movable in unison with said operating shaft, said segments dividing the housing into separate chambers, and a spring loaded check valve subject to line fluid pressure admitting line fluid to one of said chambers in the movement of said shaft and piston segment in valve opening direction, to produce hydraulic resistance by said fluid to oscillatory movement of the shaft and piston in valve closing direction.

13. A control valve for fluid flow lines as defined in claim 12, wherein the other of said housing chambers is in constant communication with the fluid line and said shaft is provided with a by-pass cooperating with said fixed segment to interconnect said first and second chambers and permit unrestrained further oscillation of the operating shaft to fully close the valve.

14. A control valve for fluid flow lines as defined in claim 13, together with means for circumferentially adjusting the position of said fixed segment with respect to said movable piston segment.

15. A control valve for fluid flow lines as defined in claim 12, together with an adjustable needle valve for bleeding fluid from said one housing chamber.

16. In a predetermining mechanism for regulating the flow of liquid through a line, a meter in said line, a valve in series connection with said meter, valve actuating mechanism, means for latching and holding said valve in open position, meter powered means for releasing said latching means after a predetermined amount of liquid has passed through the meter and permitting said valve actuating mechanism to unlatch the latching means and to move said valve toward closed position, and means connected to said actuating mechanism, inactive during valve opening movement, acting in opposition to said valve actuating means during the initial portion of closing movement for uniformly retarding closing movement of said valve, and inactive during final closing movement of the valve.

17. In a predetermining mechanism for regulating the flow of liquid through a line, a meter in said line, a valve in series connection with said meter, valve actuating mechanism, means for latching and holding said valve in open position, meter powered means for releasing said latching means after a predetermined amount of liquid has passed through the meter and permitting said valve actuating means to unlatch the latching means and to move said valve toward closed position, and hydraulic dampening means comprising a fluid chamber having an inlet connected to said line and a restricted outlet connected to said line, and a movable vane in said chamber connected to the valve and located between said inlet and outlet.

18. In a predetermining mechanism, a liquid meter, a valve in series connection with said meter, a register driven by the meter, means for latching said valve in open position, valve actuating means urging said valve toward closed position, trip means actuated by said register after a predetermined amount of liquid has passed through the meter for releasing said latching means to permit said valve actuating means to move said valve toward closed position, means for automatically re-setting said trip means, means for relatching said valve in partially open position and means actuating said trip means by the register after a further predetermined amount of liquid has passed through said meter for releasing said relatching means and permitting closure of the valve by said valve actuating means.

19. In the predetermining mechanism defined in claim 18, means opposing said valve actuating means for controlling closing movement of said valve, and means operable at the time said relatching means is released for rendering said controlling means inoperable to resist closing movement of the valve.

20. In a liquid flow control valve mechanism, a body having internal walls defining spaced ports, a flap valve fixed at one end to said walls and urged by line fluid pressure to close said ports, a shaft journalled in said body, flap lifter blades on said shaft and means for rotating said shaft to uncover said ports.

21. In a register controlled valve latching mechanism, a rotatable member, circumferentially spaced stops on said rotatable member, a pivoted latch lever having a stop face, a cam rotated by said rotatable member, a reciprocable bar having a projection adapted to engage said lever, a pivoted cam follower lever operably connected to said bar, a spring energized by rotation of said rotatable member in one direction when the valve is opened, said rocking of the rotatable member engaging said stop face with one of said stops, register actuated means for moving said bar to rock said latch lever and release said stop face from engagement with said stop, thereby permitting said spring to reversely rotate said rotatable member, and said cam during said reverse rotation of the rotatable member engaging said cam follower lever to move said bar to reset said register actuated means, and means engaging said stop face with the other stop on said rotatable member to relatch the valve in partially open position whereby a subsequent actuation of said register actuated means enables further spring urged rotation of said rotatable member to valve closed position.

22. In a fluid control meter assembly, a meter having a rotatable shaft, a register connected to said shaft and mounted on said meter for swiveling between oppositely facing positions whereby the register may be observed from either side of the meter, a valve controlling fluid flow through the meter, means for latching said valve, and means extending between the meter and register including a member guided for axial movement relative to said shaft operative in any swivelled position of said register for tripping said latch mechanism.

23. In the meter assembly defined in claim 22, a register shaft aligned with said meter shaft, a first bevel gear fixed to the meter, a gear carrier rotated by the meter driven shaft and having a second bevel gear meshed with said first bevel gear, a third bevel gear fixed to the register, and gearing on said carrier interconnecting said shafts, said bevel gears compensatively operating said gearing on the carrier to prevent rotation of the register shaft by swivelling movement of the register.

24. In the meter assembly defined in claim 23, said latch means comprising a circular trigger plate disposed about the axis of the meter driven shaft, and a striker element carried by the register adapted to contact said plate in any position of swivel of the register.

25. In the meter assembly defined in claim 24, a slot in the bottom wall of said register through which said striker element projects, and means limiting swivel movement of the register to 90° in either direction from a point where said striker element is midway of the length of said slot.

26. In a predetermining mechanism for fluid meters, a valve body having internal walls defining spaced ports, a flap valve fixed at one end to said walls and urged by line fluid pressure to close said ports, a shaft journalled in said body, flap lifter blades on said shaft, manually operable means for actuating said shaft in valve opening direction, meter register controlled latch mechanism operative to effect a two-step closing movement of the valve under the action of said line fluid pressure, and means including a hydraulically damped piston member connected with said shaft to apply throttling influence to the valve during the first step of its closing movement.

27. In a predetermining mechanism for fluid meters having a fluid flow control valve provided with an operating shaft, manually operable means for actuating said shaft in valve opening direction and means biasing the valve to normal closed position; meter register controlled latch mechanism operative to effect a plural stage closing movement of the valve in distinct steps under the action of said biasing means, meter powered means adapted to engage and move part of said latch mechanism during at least a portion of its operation to effect the plural stage closing movement of the valve and means including a hydraulically damped piston member connected with the valve shaft adapted to apply a throttling influence to the valve during the first stage of its closing movement and inactive during the final stage of closure.

28. In a predetermining mechanism, a liquid meter, a valve in series connection with said meter, a register driven by the meter, means for latching and holding said valve in open position, valve actuating means urging said valve toward closed position, trip means actuated by said register after a predetermined amount of liquid has passed through the meter for releasing said latching means to permit said valve actuating means to move said valve toward closed position, means including said trip means for relatching said valve in partially open position and means powered by said meter for moving said trip means after a further predetermined amount of liquid has passed through said meter for releasing said relatching means and permitting closure of the valve by said valve actuating means.

References Cited in the file of this patent

UNITED STATES PATENTS

| | | |
|---|---|---|
| 14,620 | Smith | Apr. 8, 1856 |
| 39,979 | White | Sept. 15, 1863 |
| 443,107 | Olin | Dec. 23, 1890 |
| 592,187 | Berr | Oct. 19, 1897 |
| 914,587 | Longstreet | Mar. 9, 1909 |
| 987,215 | Clark | Mar. 21, 1911 |
| 1,555,851 | Van Emon | Oct. 6, 1925 |
| 1,759,396 | Granberg | May 20, 1930 |
| 1,809,440 | Elder | June 9, 1931 |
| 1,831,965 | Marden | Nov. 17, 1931 |
| 1,857,627 | Elder | May 10, 1932 |
| 2,114,207 | Berck | Apr. 12, 1938 |
| 2,265,325 | Steen | Dec. 9, 1941 |
| 2,289,867 | Berck | July 14, 1942 |
| 2,309,332 | Tancred | Jan. 26, 1943 |
| 2,700,487 | Thoresen et al. | Jan. 25, 1955 |

FOREIGN PATENTS

| | | |
|---|---|---|
| 258,937 | Switzerland | Jan. 29, 1947 |